No. 11,874 Reissued Nov. 27, 1900.
H. H. EATON.
LACING HOOK FOR SHOES.
(Application filed Sept. 6, 1900.)
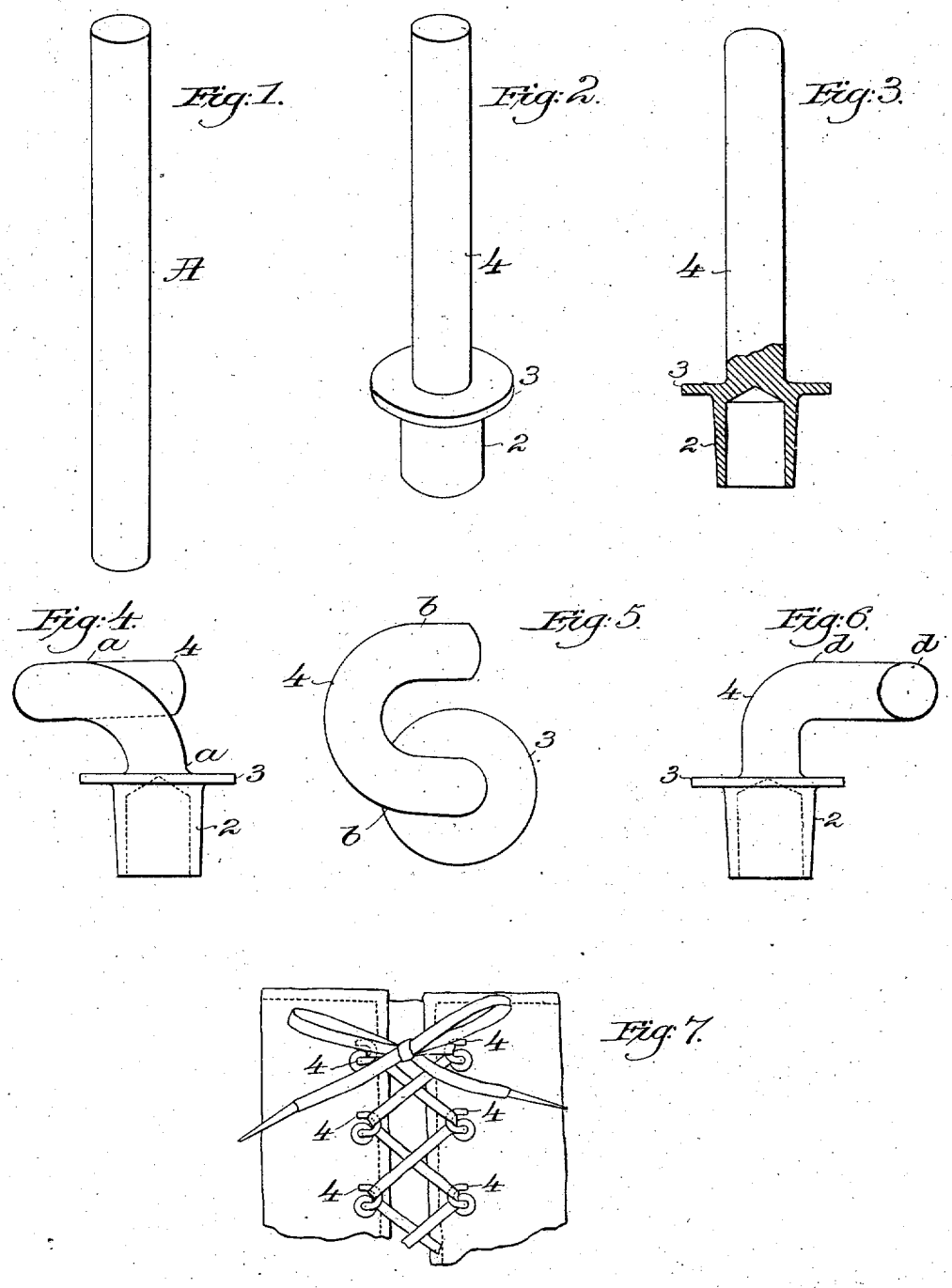
Witnesses:
John F. G. Prinkhorn
Edward S. Day
Inventor:
Harrison H. Eaton
By his Attorney
Benjamin Phillips

UNITED STATES PATENT OFFICE.

HARRISON H. EATON, OF CLEVELAND, OHIO, ASSIGNOR TO THE UNITED SHOE MACHINERY COMPANY, OF PATERSON, NEW JERSEY.

LACING-HOOK FOR SHOES.

SPECIFICATION forming part of Reissued Letters Patent No. 11,874, dated November 27, 1900.

Original No. 654,237, dated July 24, 1900. Application for reissue filed September 6, 1900. Serial No. 29,192.

*To all whom it may concern:*

Be it known that I, HARRISON H. EATON, a citizen of the United States, residing at Cleveland, in the county of Cuyahoga and State of Ohio, have invented certain new and useful Improvements in Lacing-Hooks for Shoes; and I do declare that the following is a full, clear, and exact description of the invention, which will enable others skilled in the art to which it appertains to make and use the same.

My invention has reference to lacing-hooks, and my new and improved hook is designed to be used more especially on shoes where lacing-hooks of various kinds have been used heretofore; but it is not necessarily confined to shoes as such and may also be applied to gloves, leggings, and other uses as convenience or advantage may suggest.

In the accompanying drawings, Figure 1 is a perspective elevation of a plain blank from which my new hook is produced. Fig. 2 is a perspective elevation of the hook-blank as it appears after the first step in its manufacture has been taken, and which consists in striking up the shank and collar, as shown. Fig. 3 is a plain elevation of the blank, partly in section, as it appears after the second step in its manufacture, which consists in drilling the shank and rounding the opposite extremity, substantially as shown. Fig. 4 is an elevation of the article after the third and last step in its manufacture—viz., the bending of the stem of the blank to hook shape—and showing the article completed. Fig. 5 is a plan view of the completed hook, and Fig. 6 is an elevation with a quarter-turn to the right from Fig. 4. Fig. 7 shows a section of shoe and lacing thereon.

The several views show the development of the hook step by step in its manufacture from what is primarily a part of a coil of wire, the blank A being presumably severed from such a coil and having the thickness or size of the hook proper in the completed article. Of course the production or preparation of the blank by any other means or from any other source may occur and not change the invention. Having the blank A from any source, the first step is to strike up or upset one end thereof in a suitable die, so as to form the enlarged substantially drum-shaped shank 2 and the substantially disk-shaped collar 3 about its top, but leaving the remainder or stem 4 of the blank unchanged from end to end. Farther on this stem is referred to as the "hook proper," which it becomes in the process of manufacture; but it is necessary to have the shank 2 tubular, so that it may be split and spread like an eyelet to fasten the hook in place. To this end the shank is drilled to a relatively thin shell, as seen in Fig. 3, leaving the wall of the shank in form to be easily split and folded back. At the same time substantially that this is done the extremity of the stem is rounded and the blank is now ready for the last step in its conversion to a completed article.

In Figs. 4 to 6 I show a completed hook. Taking the article as it appears in Fig. 3, it is subjected to a bending process, whereby it assumes the shape shown in these figures and wherein there are at least two conspicuous curvatures and one subordinate one, the first between *a* and *a*, Fig. 4, and the second between *b* and *b*, Fig. 5. These points of curvature are taken approximately, and with the two bends the stem is formed into the hook proper, the first bend giving the elevation above the collar 3 and the second bend bringing the hook into substantially parallel relation to the said collar, substantially as shown in Figs. 4 and 6. A slight dip in the hook between the points *d* and *d* is the third and subordinate curve referred to. The collar 3 lies close down upon the leather when the hook is in place, and this brings the hook proper, 4, necessarily quite close to the leather, because the elevation of the hook is not much to begin with and there is a tendency for the leather to puff out about the disk more or less, especially when the shoe is on the foot. Hence there is intended to be only sufficient room between hook and leather for comfortable and easy lacing, and if the lacing be pretty tight the hook naturally inclines and lies down quite close to the leather. This, instead of being objectionable, is desirable, because it helps to give a dressed appearance to the shoe and avoids projections where it is desirable to have as much smoothness as possible.

It will be seen in Fig. 5 that the upper curve of the hook 4 is practically wholly outside of the disk 3 in plan view, thus avoiding the objection of two metallic surfaces between which to enter the shoestring, as would be the case if the disk were wide enough to extend out under the point of the hook. By my construction and allowing the hook to lie close to the leather I have a yielding element in the leather to deal with in both lacing and unlacing the shoe. Indeed, it is designed that the hook 4 shall lie comparatively close to the leather all the time, as stated, and the yieldableness of the leather affords all the extra accommodation required.

It will be noticed in Fig. 6 that the hooks are, in fact, so placed on the shoe that they cannot engage or catch in skirt or trousers, even if they stood out from the leather when in use; but both appearance and utility suggest that they lie as close to the leather as is consistent with convenience in lacing and their service as hooks.

What I claim is—

1. A lacing-hook struck up from a single piece of wire and having a tubular shank, a collar about the top of the shank and a hook having its base centrally of the collar, and closing the top of said shank and extending upward and outward by the curves *a*, *a* and *b*, *b* to a position wholly outside the collar in its main portion, substantially as described.

2. A lacing-hook struck up from a single piece of wire and having a tubular shank, a collar about the top of the shank and a hook having its base centrally of the collar and closing the top of said shank and extending upward and outward by the curves *a*, *a* and *b*, *b* to a position wholly outside the collar in its main portion and provided with a dip, *d*, *d*, substantially as described.

Witness my hand to the foregoing specification this 30th day of August, A. D. 1900.

HARRISON H. EATON.

Witnesses:

FRED O. FISH,

A. E. WHITE.